(12) United States Patent
Buss et al.

(10) Patent No.: US 6,598,338 B2
(45) Date of Patent: Jul. 29, 2003

(54) PLANT WATERING DEVICE HAVING USER-SELECTABLE WATER-DELIVERY APERTURES

(75) Inventors: Melvin H. Buss, Burlington, VT (US); Frank F. Oliver, Essex Junction, VT (US)

(73) Assignee: America's Gardening Resource, Inc., Burlington, VT (US)

( * ) Notice: Subject to any disclaimer, the term of this patent is extended or adjusted under 35 U.S.C. 154(b) by 0 days.

(21) Appl. No.: 09/803,686

(22) Filed: Mar. 9, 2001

(65) Prior Publication Data

US 2001/0023555 A1 Sep. 27, 2001

Related U.S. Application Data

(60) Provisional application No. 60/188,577, filed on Mar. 10, 2000.

(51) Int. Cl.[7] .............................................. A01G 29/00
(52) U.S. Cl. .................................................... 47/48.5
(58) Field of Search ........................... 47/48.5; 111/7.1, 111/7.2, 127; 405/39, 40, 41, 43–45

(56) References Cited

U.S. PATENT DOCUMENTS

| | | | | |
|---|---|---|---|---|
| 2,334,253 A | | 11/1943 | Davis | 221/67 |
| 3,345,774 A | | 10/1967 | Delbuguet | 47/48.5 |
| 3,755,966 A | | 9/1973 | Smith | 47/48.5 |
| 3,762,437 A | * | 10/1973 | King, Sr. | 137/512 |
| 3,821,863 A | | 7/1974 | Chan | 47/48.5 |
| 3,846,954 A | | 11/1974 | Meyers | 53/14 |
| 4,089,133 A | | 5/1978 | Duncan | 47/48.5 |
| 4,300,309 A | | 11/1981 | Mincy | 47/48.5 |
| 4,402,631 A | * | 9/1983 | Rosenthal | 239/242 |
| 4,499,686 A | | 2/1985 | Scragg | 47/48.5 |
| 4,866,880 A | | 9/1989 | Weinblatt | 47/79 |
| 5,249,885 A | * | 10/1993 | Florence | 405/36 |
| 5,720,129 A | * | 2/1998 | Lantinberg | 47/56 |
| 5,836,106 A | * | 11/1998 | Alex | 47/48.5 |
| 5,896,700 A | | 4/1999 | McGough | 47/48.5 |
| 5,918,412 A | | 7/1999 | Shen | 47/48.5 |
| 5,924,240 A | | 7/1999 | Harrison | 47/48.5 |
| 6,220,525 B1 | * | 4/2001 | McSherdon | 239/271 |
| 6,243,986 B1 | * | 6/2001 | Crowley | 47/48.5 |

FOREIGN PATENT DOCUMENTS

| | | | | | |
|---|---|---|---|---|---|
| FR | 2654301 | * | 5/1991 | | A01G/29/00 |
| JP | 407289102 | * | 11/1995 | | A01G/29/00 |
| JP | 8-131049 A | * | 5/1996 | | A01G/29/00 |
| JP | 408131049 | * | 5/1996 | | A01G/29/00 |

OTHER PUBLICATIONS http://www.thompson-morgan.com/seeds/uk/index.html, Water Wizard, printed on Jan. 8, 2001.

* cited by examiner

Primary Examiner—Peter M. Poon
Assistant Examiner—Son T. Nguyen
(74) Attorney, Agent, or Firm—Downs Rachlin Martin PLLC

(57) ABSTRACT

A plant watering device (10) having user-selectable water delivery apertures (18). The plant watering device comprises a dispenser (22) for insertion into a soil (12) surrounding a plant (16). The dispenser is divided into a plurality of zones (28, 30, 32) and defines a chamber (26) for receiving water from a reservoir (46) defined by a container (48) engagable with the dispenser via a receiver (50). Each zone corresponds to a particular type of soil with which the plant watering device may be used and contains a plurality of the apertures. Each aperture includes a removable seal that allows a user to selectively activate that aperture. To use the plant watering device, a user determines the type of soil with which the device will be used and then removes at least one of the removable seals from the apertures within the zone most closely corresponding to the soil type determined by the user. The dispenser may also include a shield (40) adjacent each aperture for preventing the soil from clogging an activated aperture while the user inserts the dispenser into the soil.

31 Claims, 4 Drawing Sheets

PLANT WATERING DEVICE HAVING USER-SELECTABLE WATER-DELIVERY APERTURES

CROSS-REFERENCE TO RELATED APPLICATION

This application claims the benefit of priority of U.S. Provisional Application Ser. No. 60/188,577, filed Mar. 10, 2000 and entitled "Aquacone."

FIELD OF INVENTION

The present invention is generally related to the field of plant husbandry. More particularly, the present invention is directed to a plant watering device having user-selectable water-delivery apertures.

BACKGROUND OF THE INVENTION

Plants require water and other nutrients to survive. When located in their natural settings, indigenous plants generally receive sufficient water and nutrients from their environment, which includes the soil and climatic conditions in which they grow. Cultivated plants, such as plants grown indoors in containers or outdoors in controlled beds, however, generally do not receive sufficient water and nutrients without human intervention. Humans typically must continually water and/or fertilize cultivated plants so that the plants remain viable.

One conventional method of watering cultivated plants is to provide water from a watering can, garden hose or the like. This method typically required a large amount of human interaction, unless timers, automated valves and other sophisticated and costly equipment is used. However, a typical domestic gardener who may not be able to afford such an sophisticated watering system must closely monitor watering so that the plants receive the proper amount of water. Unfortunately, the domestic gardener may not always have the time it takes to water plants in a conventional manner.

Various watering devices have been designed in an attempt to provide some of the benefits of sophisticated automated watering systems but at a lower monetary cost. For example, U.S. Pat. No. 4,866,880 to Weinblatt shows a plant watering device comprising an elongate tube insertable into the soil surrounding the roots of one or more plants. The tube includes a plurality of apertures for releasing water from inside the tube and a generally frusto-conical tip that allows the tube to be inserted easily into the soil. The outer surface of the tube includes a spiral ridge to aid inserting the tube into the soil.

The Weinblatt plant watering device also comprises an inner member that defines a chamber and is rotatably, and snugly, engaged within the tube. The inner member contains apertures that may be moved into and out of registration with the apertures of the tube by rotating the inner member. By placing the apertures of the inner member out of registration with the apertures of the tube before inserting the device into the soil, the inner member will block soil from falling into the chamber within the inner member when the device is inserted into the soil. After the device has been inserted into the soil, the inner member is rotated relative to the outer member to place the apertures of the inner member and tube in full registration with one another to allow water to flow from the chamber to the soil surrounding the device.

The Weinblatt watering device further comprises a reservoir in fluid communication with the chamber for storing an appropriate amount of water to be delivered to the plants. A timer and valve coupled to the timer are located between the reservoir and chamber for regulating the flow of water from the reservoir to the soil surrounding the device.

The Weinblatt watering device has several shortcomings. Among these are that it is relatively complex, requiring numerous components, such as the tube, inner member, timer and valve, which make the device relatively expensive. Also, the timer aid valve make the device less robust than desired, increasing the likelihood that the device will fail. In addition, the Weinblatt device is not easily customizable to different soil types, watering needs of a particular plant or location of the plant(s) relative to the plant watering device. These and other shortcomings are overcome by the present invention.

SUMMARY OF THE INVENTION

In one aspect, the present invention is directed to a device for providing a liquid from a reservoir to a porous medium. The device comprises a dispenser for insertion into the porous medium. A chamber is defined within the dispenser, the chamber for receiving the liquid from the reservoir. At least one removable seal is located on the dispenser and is selectively removable to provide an aperture extending between the porous medium and the chamber when the dispenser is inserted at least partially into the porous medium.

In another aspect, the present invention is directed to a method of providing a liquid to a porous medium. The method comprises the step of providing a dispenser for inserting into the porous medium, wherein the dispenser defines a chamber for receiving the liquid and has at least one removable seal located between the chamber and the environment surrounding the dispenser. Then, the at least one removable seal is removed such that the chamber is in fluid communication with the environment surrounding the dispenser.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein.

DETAILED DESCRIPTION OF THE INVENTION

Figure 1:
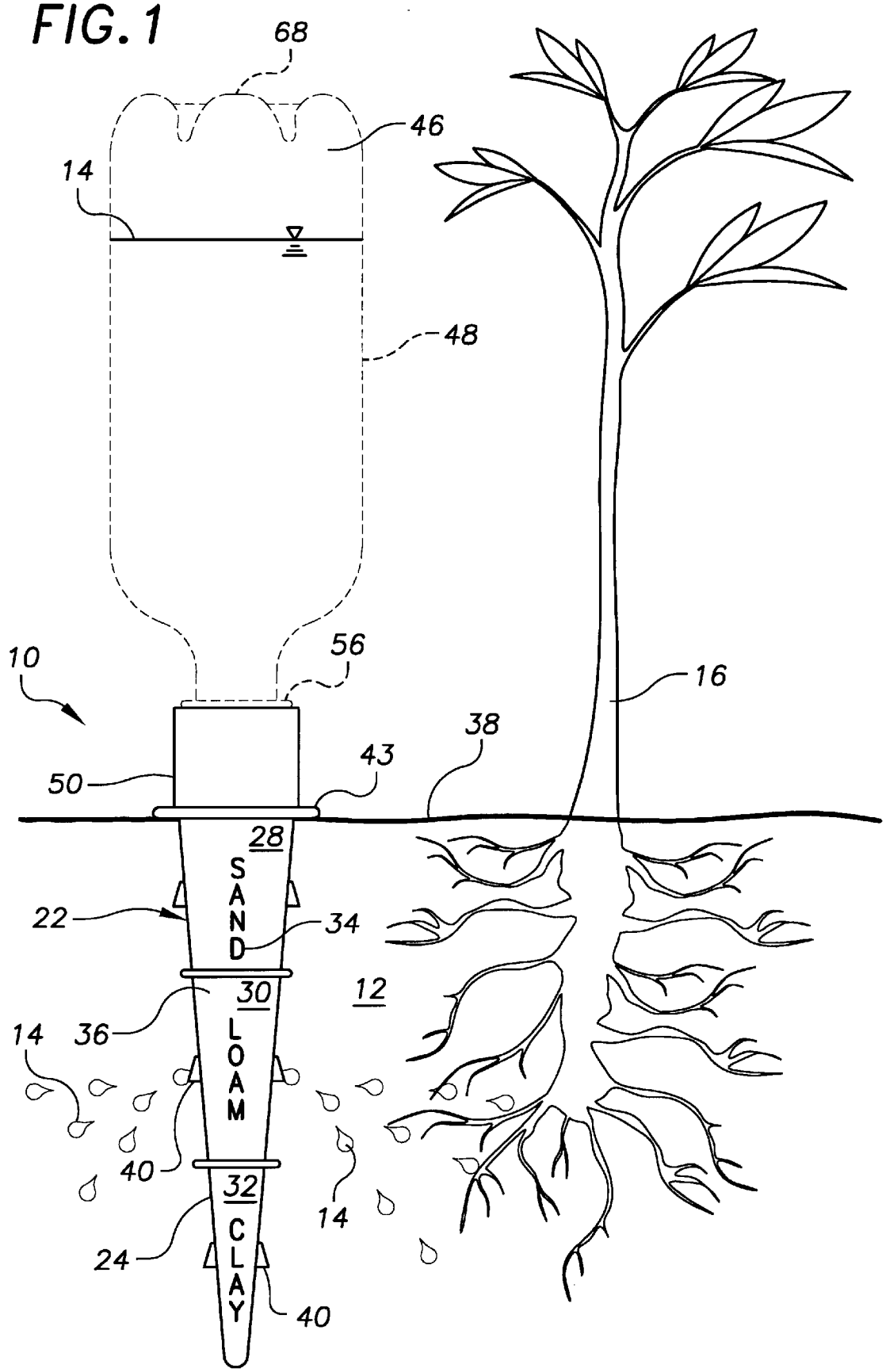
FIG. 1 is an elevational view of a plant watering device of the present invention, showing the device in use.
Figure 2:
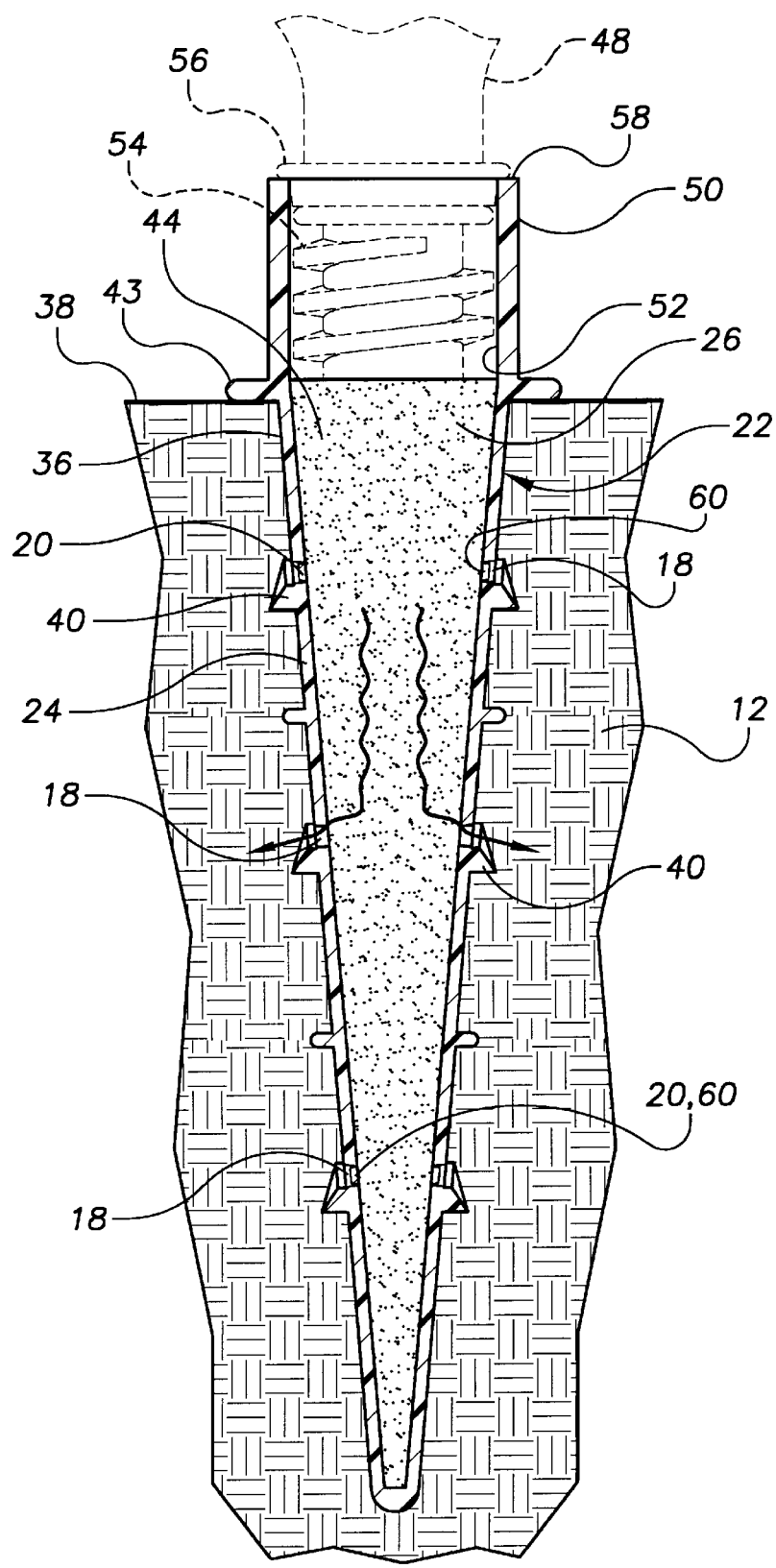
FIG. 2 is an elevational cross-sectional view of the plant watering device of FIG. 1.
Figure 3:
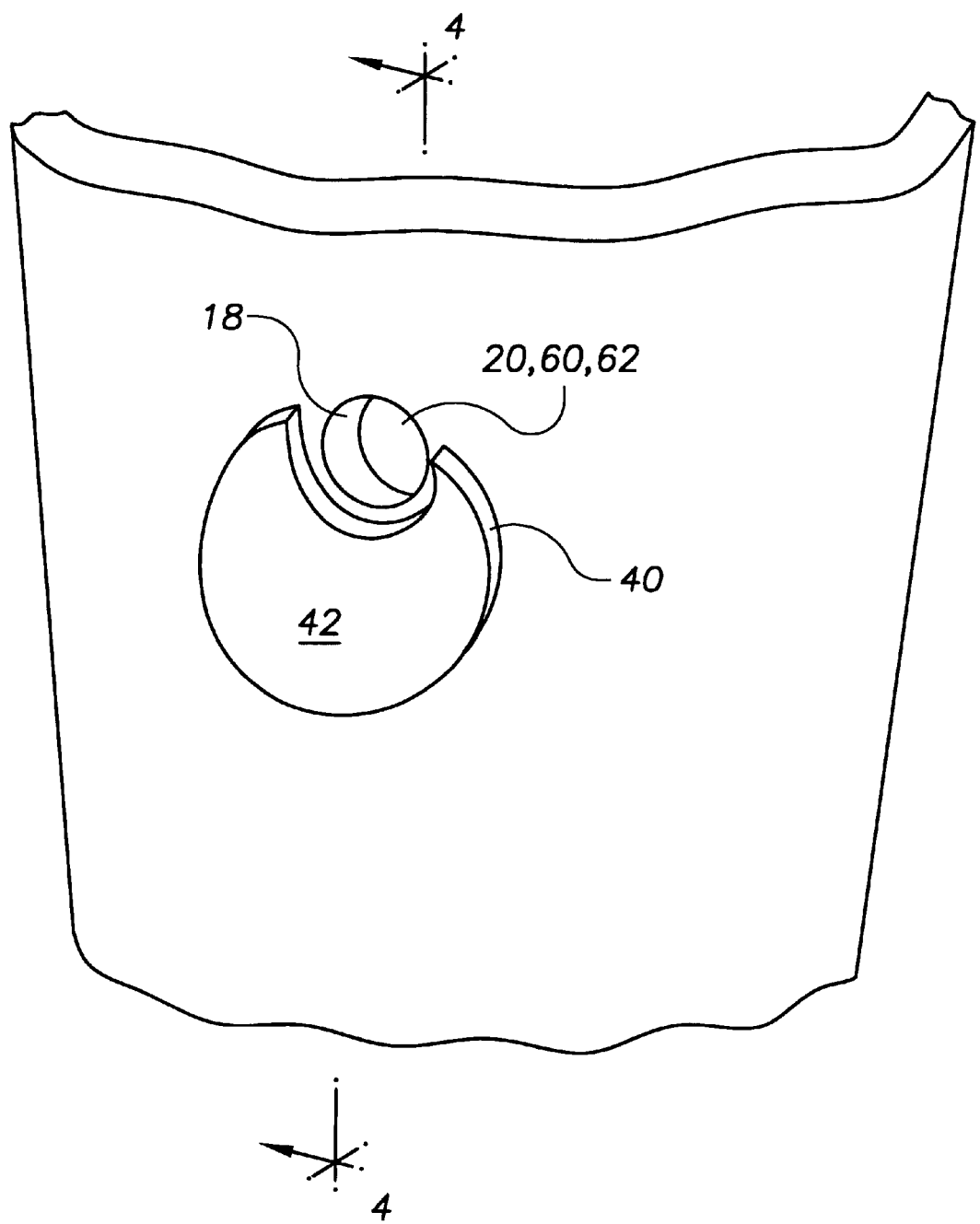
FIG. 3 is an enlarged perspective view of the plant watering device of FIG. 1, showing one of the apertures and its corresponding soil shield.
Figure 4:
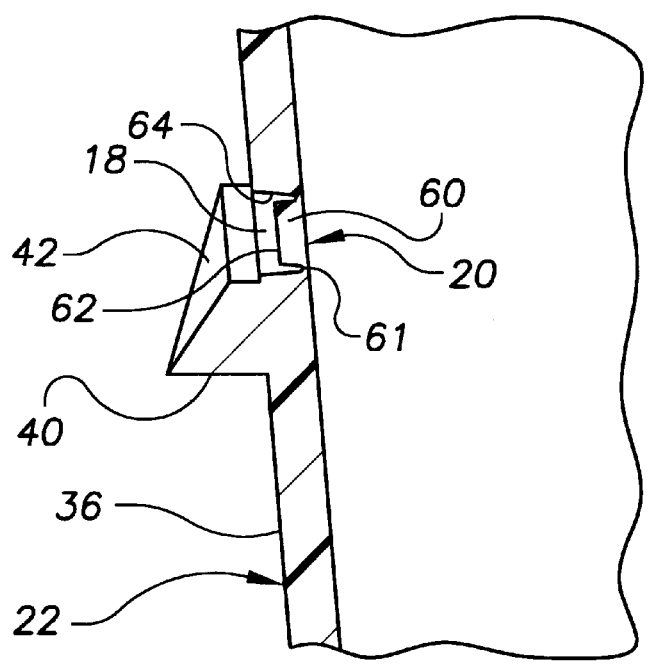
FIG. 4 is a cross-sectional view of one of the removable seals taken along line 4—4 of FIG. 3.

Referring now to the drawings, wherein like elements are indicated by like numerals, FIGS. 1–4 show in accordance with the present invention a watering device, which is generally indicated by the numeral 10. Watering device 10 may be inserted into a soil 12 to allow the controlled dispensing of water 14, or other liquid, e.g., fertilizer, to one or more plants, such as plant 16, over a period of time without requiring the continuous presence by a user. Although watering device 10 is shown and described in connection with soil and plants, one skilled in the art will recognize that the watering device may be used in a soil-less medium, which contains one or more components such as peat, sphagnum, compost, perlite, and ground coconut husks, among others, and for providing a liquid to the porous medium for reasons other than watering/feeding plants.

An important feature of watering device 10 is that it may include a plurality of apertures 18 each having a removable seal 20 that a user may remove to adjust the rate water 14 is provided to soil 12 depending upon certain parameters, such as the type of soil surrounding plant 16, amount of water required by the plant, ambient moisture in the soil and climatic conditions, among others. In addition, depending upon the placement of apertures 18 around the perimeter of watering device 10, a user may selectively activate apertures 18 to adjust the direction water 14 flows from the watering device to accommodate the location of plant 16 or several plants relative to the watering device.

Watering device 10 comprises a dispenser 22 having a sidewall 24 that defines a chamber 26 and contains apertures 18. Dispenser 22 is preferably frusto-conical in shape to allow the dispenser to be easily inserted into soil 12. Dispenser 22 is preferably made of plastic, but may be made of any material such as hard rubber, metal or ceramic, among others. As described in more detail below, dispenser 22 is preferably divided along its length into a plurality of zones, such as zones 28, 30 and 32, that correspond to the type of soil, e.g., clay, loam or sand, among others, with which watering device 10 is intended to be used. Each zone 28, 30 and 32 may optionally include an indicia 34, such as the words "sand", "loam" and "clay", denoting the soil type corresponding to that zone. For example, indicia 34 may be formed into or on the outer surface 36 of dispenser 22, printed on the outer surface, applied as a decal or the like to the outer surface or any combination of these.

In general, the larger the particles of soil 12, the closer to the surface 38 of soil 12 the corresponding zone 28, 30 and 32 should be on dispenser 22. This is so because the larger the soil particles, the lower the capillarity of the soil and, thus, the shorter the lateral distance water 12 will flow away from dispenser 22 toward plant 16 after exiting the one or more activated apertures 18. In addition, a soil composed of relatively large particles generally drains faster than a soil composed of relatively small particles. Thus, to allow more of water 14 to reach plant 16 when soil 12 is composed of relatively large particles, water 14 should be provided from a location closer to surface 38 of the soil than if the soil were composed of relatively small particles. Accordingly, in the embodiment shown, the "sand" zone 28 is located higher than the "loam" zone 30 because sand comprises larger particles than loam, and the "loam" zone is located higher than the "clay" zone 32 because loam comprises larger particles than clay.

Dispenser 22 may optionally include a shield 40 adjacent each aperture 18 to prevent clogging of the activated apertures with soil 12 by diverting the soil away from the apertures as a user inserts dispenser 22 into the soil. Shields 40 are preferably made of the same material as dispenser 22 and formed integrally therewith. Each shield 40 preferably has a generally circular outer periphery and is located such that the corresponding aperture 18 is located radially inward from the outer periphery. In addition, when dispenser 22 is in use, a surface 42 of shield 40 directs water 14 away from the dispenser as it exits an activated aperture 18. The generally crescent-shaped shields 40 shown are presently most preferred because of their exceptional ability to provide the desired functions. However, one skilled in the art will appreciate that shields 40 may be any shape that provides the desired functions of diverting soil 12 and/or directing water 14 as it exits activated apertures 18 and further that the shields' shape, distance they protrude from outer surface 36 of dispenser 22 and their location relative the corresponding apertures may affect the performance of the shields.

Dispenser 22 may also optionally include a collar 43 that prevents a user from inserting the dispenser too far into soil 12. Collar 43 is preferably made of the same material as, and is formed integrally with, dispenser 22.

In a preferred embodiment, chamber 26 may be filled with a porous material 44, such as sand, open cell foam or fibrous material, among others, that slow the delivery of water 14 from dispenser 22 through apertures 18. Alternatively, if apertures 18 are sufficiently small and/or the user activates relatively few of the apertures, the dispensing rate of dispenser 22 may be sufficiently slow without providing porous material 44.

When watering device 10 is in use, chamber 26 fluidly communicates with a reservoir 46 that contains water 14 to be provided to plant 16 over a period of time. Reservoir 46 is preferably defined by a container 48 separate from dispenser 22. For example, in a presently preferred embodiment, container 48 is a conventional beverage bottle, such as a two-liter plastic soda bottle. In other embodiments, container 48 may be a dedicated container sold with or as an accessory to dispenser 22, a container formed integrally with the dispenser or a type of non-dedicated container other than a beverage bottle, such as a suitably-cleaned domestic clothes-washing detergent bottle or the like.

If container 48 is not formed integrally with dispenser 22, a receiver 50 may be provided to engage and hold the container and allow reservoir 46 to fluidly communicate with chamber 26. Receiver 50 is preferably made of the same material as, and formed integrally with, dispenser 22. However, receiver 50 may be made of a different material and/or formed separately from dispenser 22. In a preferred embodiment, the inside diameter of receiver 50 is sized so that inner surface 52 snugly engages an outlet 54 of container 48. When container 48 is a conventional plastic soda bottle, or similar bottle, having a flange 56, upper end 58 of receiver 50 engages the flange to provide stability to the bottle.

Before dispenser 22 is first used, each aperture 18 preferably contains a removable seal 20, as described above, that allows a user to selectively activate the corresponding aperture to allow water 14 to flow from chamber 26 to soil 12. However, in alternative embodiments, dispenser 22 may include some apertures 18 that do not include a removable seal, i.e., "pre-activated" apertures, and some apertures that include removable seals 20, i.e., "user-activated" apertures. Apertures 18 may be provided in any number and at any locations desired. However, in a preferred embodiment, two apertures are provided in each of zones 28, 30 and 32 in diametrically opposing relationship with one another. In addition, apertures 18 may be any shape and size desired. However, they are preferably circular in shape and have diameters ranging from about 0.03 inches to about 0.125 inches.

In a preferred embodiment, each removable seal 20 is formed integrally with dispenser 22 as a panel 60 characterized as having a thickness less than the thickness of sidewall 24 of the dispenser and a frangible seal 61 extending between the panel and sidewall. Panel 60 preferably has a cross-sectional shape the same as the cross-sectional shape of corresponding aperture 18. For example, if aperture 18 is circular, panel 60 would be cylindrical. Preferably, the outer surface 62 of panel 60 is located radially inward of outer surface 36 of sidewall 24. In this manner, a cavity 64 (FIG. 4) is formed in sidewall 24 that allows a user to readily identify the location of the corresponding aperture 18.

The thicknesses of sidewall 24, panel 60 and frangible seal 61 depend largely upon the type of material used. For example, if polyethylene plastic is used, the thickness of sidewall 24 is preferably about 0.062 inches, the thickness of frangible panel 60 is preferably about 0.03 inches to about 0.04 inches and the thickness of frangible seal is preferably about 0.003 inches to about 0.02 inches. In any event, the thickness of frangible seal 61 should be such that a user can remove panel 60 relatively easily, for example using the point of a ballpoint pen, an end of a straightened wire-type paperclip, a size 6d nail or the like. In addition, the thickness of panel 60 should be such that the panel does not break before frangible seal 61 breaks. One skilled in the art will understand the design parameters that must be considered to provide panel 60 and frangible seal 61 with their necessary function.

Figure 5:
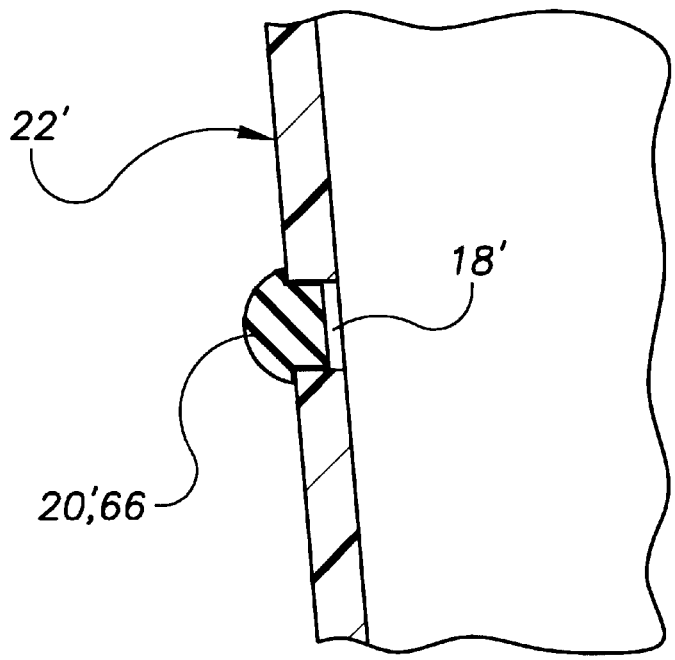
FIG. 5 is a cross-sectional view of an alternative embodiment of the removable seals of the present invention.

Removable seal may be embodied in a form other than panel 60 and frangible seal 61. For example, FIG. 5 shows removable seal 20' as being a removable plug 66 having an interference fit with a corresponding aperture 18'. If dispenser 22' is made of plastic, removable plug 66 may also be made of plastic. Alternatively, removable plug 66 may be made of another material, such as rubber. Thus, to activate aperture 18', a user need only remove removable plug 66 from the aperture.

Plant watering device 10 as shown in FIGS. 1–4 may be used as follows. After a user has selected one or more plants 16 that the user desires to water with watering device 10, the user determines the type of soil 12 surrounding the plant. Then, the user finds which of zones 28, 30 and 32, "sand", "loam", and "clay", respectively, corresponds most closely with the type of soil the user determined in the previous step. The user then removes one or more removable seals 20 of apertures 18 located in the desired zone to activate these apertures. For example, if the user determines that the type of soil surrounding plant 16 is loam, predominantly loam or composed of a material having physical properties similar to loam, the user should remove one or more of the removable seals 20 in the "loam" zone, which corresponds to zone 30. The user may then remove panel 60 of removable seal 20 by breaking frangible seal 61, e.g., by punching it out with a suitable instrument (not shown), such as the point of a ballpoint pen or the end of a straightened paper clip or size 6d nail, as mentioned above.

Depending upon a number of parameters, such as the number of plants 16, the number of removable seals 20 provided in a particular zone, the amount of water required by plants and the location of the plants relative to dispenser 22, the user may remove some or all of removable seals within a desired zone. For example, if dispenser 22 is used for a single small plant requiring a relatively slow watering rate, the user may remove only one of removable seals 20 from the aperture 18 that the user will face toward the plant. One skilled in the art will recognize that since the number and location of apertures may vary widely depending upon parameters such as the type of soil and the type and size of plants with which dispenser may be used, it is impractical to list all of possible configurations of apertures 18 upon dispenser 22. However, all such configurations are deemed to fall within the spirit and scope of the present invention.

After the user has removed the desired removable seals 20, the user may optionally fill chamber 26 with porous material 44 to slow the rate water passes through the activated apertures 18 to soil 12. As will be understood by those skilled in the art, the type of porous material 44, e.g., sand, soil, fibrous material, and/or its characteristics, e.g., grain size, pore size, in-situ density, may be varied to adjust the flow rate. Depending upon parameters, such as the desired flow rate of water from dispenser 22, the size and number of activated apertures 18 and the depth of water 14 in reservoir 46, i.e., the hydraulic head, porous material 44 may be eliminated.

The user may then insert dispenser 22 into soil 12 adjacent plant 16 until collar 43 contacts surface 38 of the soil and engage container 48 with receiver 50. If container 48 is closed at its upper end 68, the user should fill reservoir 46 with water 14 before engaging the container with receiver 50. However, if upper end 68 is open, the user may fill reservoir 46 after engaging container 48 with receiver 50. The size of container 48 may be varied to adjust the total amount of water 14 delivered to soil 12, the rate at which the water is released from watering device 10 and/or the amount of time the water is delivered to the soil.

For example and with all other parameters being constant, a completely filled two-liter soda bottle will provide twice as much water as, and generally deliver water for a longer period of time than, a completely filled one-liter bottle. If the two- and one-liter bottles have the same height as one another, the flow rate of water will be about the same. If, however, one bottle is taller than the other, the taller bottle will generally deliver water at a faster rate than the shorter bottle, at least initially. This is so because the taller bottle has a larger hydraulic head. In addition, the rate of flow from watering device 10 may be further controlled by changing the state of upper end 68 of container 48. When upper end 68 of container 48 is closed, the flow rate of water from watering device 10 will typically be slower than if the upper end of the same container were open. This is so because a closed-ended container develops somewhat of a vacuum as water evacuates reservoir 46 and is dispensed to soil 12 by watering device 10.

After the user has inserted dispenser 22 into soil 12 and has filled reservoir 46 with water 14, the user may then leave watering device 10 unattended until the reservoir and chamber 26 are substantially empty. At this time, the user may refill reservoir 46 either by adding water to the reservoir through open upper end 68 of container 48, or by removing the container, refilling it and re-engaging it with receiver 50. If porous material 44 is used, it may have to be periodically replaced due to clogging.

While the present invention has been described in connection with preferred embodiments, it will be understood that it is not so limited. On the contrary, it is intended to cover all alternatives, modifications and equivalents as may be included within the spirit and scope of the invention as defined in the appended claims.

What is claimed is:

1. A device for providing a liquid from a reservoir to a porous medium, comprising:
   a) a dispenser for insertion into the porous medium;
   b) a chamber defined within said dispenser, said chamber for receiving the liquid from the reservoir when said dispenser is in use; and
   c) at least one removable seal located on said dispenser and being selectively removable from said dispenser by a user to provide an outlet aperture extending between the porous medium and said chamber when the dispenser is inserted at least partially into the porous medium and for allowing the liquid to flow out of said chamber when said dispenser is in use.

2. A device according to claim 1, wherein said dispenser has a length and a plurality of removable seals disposed along said length.

3. A device according to claim 2, wherein said dispenser is divided into at least two zones, each zone corresponding to a particular type of porous medium and containing at least one of said plurality of removable seals.

4. A device according to claim 3, wherein said dispenser is divided into at least three zones, each zone corresponding to a particular type of porous medium and containing at least one of said plurality of removable seals.

5. A device according to claim 3, wherein each of said at least two zones contains an indicia of the particular type of porous medium corresponding to that zone.

6. A device according to claim 5, wherein said indicia indicates a soil type.

7. A device according to claim 1, wherein said at least one removable seal comprises a panel and a frangible seal extending between said panel and said dispenser.

8. A device according to claim 1, wherein said at least one removable seal comprises a removable plug.

9. A device according to claim 1, wherein the reservoir is defined by a container separate from said dispenser, the device further comprising a receiver attached to said dispenser for engaging the container such that the reservoir fluidly communicates with said chamber when said dispenser is engaged with the container.

10. A device according to claim 1, wherein said dispenser has an outer surface and further comprises a shield located on said outer surface adjacent said at least one removable seal.

11. A device for providing a liquid from a reservoir to a porous medium, comprising:
    a) a dispenser for insertion into the porous medium, said dispenser having a length;
    b) a plurality of zones located along said length of said dispenser, each zone corresponding to a particular type of porous medium and delimited from the other one or more of said plurality of zones by at least one indicia located on said dispenser;
    c) a chamber defined within said dispenser, said chamber for receiving the liquid from the reservoir; and
    d) at least one removable seal located in each of said plurality of zones, each of said removable seals being selectively removable to provide an aperture extending between the porous medium and said chamber when the dispenser is inserted at least partially into the porous medium.

12. A device according to claim 11, wherein said dispenser is divided into at least three zones along said length of said dispenser, each of said at least three zones corresponding to a particular type of porous medium and containing at least one removable seal.

13. A device according to claim 11, wherein the reservoir is defined by a container separate from said dispenser, said device further including a receiver attached to said dispenser for engaging the container and allowing the reservoir to fluidly communicate with said chamber when said dispenser is engaged with the container.

14. A device according to claim 11, wherein each of said at least one removable seal comprises a panel and a frangible seal extending between said panel and said dispenser.

15. A device according to claim 11, wherein each of said at least one removable seal comprises a removable plug.

16. A device according to claim 11, wherein said dispenser has an outer surface and further comprises a shield located on said outer surface adjacent each of said removable seals.

17. A device according to claim 11, wherein each of said plurality of zones contains an indicia denoting the type of porous medium corresponding to that zone.

18. A device for providing a liquid from a reservoir to a soil, comprising:
    a) a dispenser for insertion into the soil, said dispenser having an outer surface;
    b) a chamber defined within said dispenser, said chamber for receiving the liquid from the reservoir;
    c) a plurality of apertures formed in said dispenser, each of said plurality of apertures extending between said chamber and said outer surface of said dispenser;
    d) a plurality of shields each located adjacent a corresponding one of said plurality of apertures for diverting the soil away from said corresponding aperture as a user inserts said dispenser into the soil, each of said plurality of shields protruding from said outer surface of said dispenser; and
    e) a plurality of removable seals each located at a corresponding one of said plurality of apertures, each of said plurality of removable seals removable from said dispenser for allowing a user to selectively open said corresponding aperture.

19. A device according to claim 18, further comprising a plurality of removable seals each located at a corresponding one of said plurality of apertures, each of said plurality of removable seals for allowing a user to selectively activate said corresponding aperture.

20. A device according to claim 18, wherein each of said plurality of removable seals comprises a panel and a frangible seal extending between said panel and said dispenser.

21. A device according to claim 18, wherein each of said plurality of removable seals comprises a removable plug.

22. A device for providing a liquid from a reservoir to a porous medium, comprising:
    a) a dispenser having a sidewall defining a chamber for receiving the Liquid from the reservoir and a plurality of outlet apertures each in fluid communication with said chamber, said dispenser insertable into the porous medium; and
    b) a plurality of removable seals each corresponding to a corresponding one of said plurality of outlet apertures and configured to be selectively removed to allow a user to open any one or more of said plurality of outlet apertures so that during use the liquid flows out of said chamber through only those of said plurality of apertures where certain ones of said plurality of removable seals have been removed.

23. A device according to claim 22, wherein said means for allowing a user to selectively control the flow rate comprises a plurality of outlet apertures, wherein at least some of said plurality of outlet apertures each have a removable seal.

24. A device according to claim 23, further comprising a means for diverting the soil away from each of said plurality of outlet apertures.

25. A device according to claim 24, wherein said dispenser has an outer surface and said means for diverting soil away from each of said plurality of outlet apertures comprises a shield protruding from said outer surface.

26. A method of providing a liquid to a porous medium, comprising the steps of:

a) providing a dispenser for inserting into the porous medium, said dispenser having at least one outlet aperture and defining a chamber for receiving the liquid and having at least one removable seal located at said at least one outlet aperture between said chamber and the environment surrounding said dispenser; and b) removing said at least one removable seal from said dispenser by a user to open said at least one outlet aperture such that said chamber is in fluid communication with the environment surrounding said dispenser.

27. A method according to claim 26, wherein said dispenser has a plurality of removable seals and step b) including removing fewer than said plurality of removable seals.

28. A method according to claim 27, wherein said plurality of removable seals are distributed among at least two zones so that each of said at least two zones includes a portion of said plurality of removable seals, each zone corresponding to a type of porous medium, the method further comprising the step of determining the particular type of porous medium into which said dispenser is to be inserted, and step b) includes removing the portion of said plurality of removable seals in said zone corresponding to said particular type of porous medium into which said dispenser is to be inserted.

29. A method according to claim 26, wherein said at least one removable seal comprises a panel and a frangible seal extending between said panel and said dispenser and step b) comprises removing said panel by breaking said at least one frangible seal.

30. A method according to claim 26, wherein said at least one removable seal comprises a removable plug and step b) comprises removing said removable plug.

31. A method of providing a liquid to a soil having a type, comprising the steps of:

a) providing a dispenser for inserting into the soil, said dispenser defining a chamber for receiving the liquid and having a length and a plurality of removable seals, said dispenser divided into at least two zones along said length, each of said at least two zones corresponding to a particular soil type and containing a portion of said plurality of removable seals;

b) determining the type of the soil; and c) removing said portion of said plurality of removable seals in the one of said at least two zones corresponding most closely to the type of the soil determined in step b).

* * * * *